US011151104B2

(12) United States Patent
Engrav et al.

(10) Patent No.: US 11,151,104 B2
(45) Date of Patent: Oct. 19, 2021

(54) TIME SYSTEMS AS DATA

(71) Applicant: Microsoft Technology Licensing, LLC, Redmond, WA (US)

(72) Inventors: Peter L. Engrav, Seattle, WA (US); Aaron E. Erlandson, Kirkland, WA (US); Stephen White, Kirkland, WA (US); Trevor J. Harris, Seattle, WA (US); Malia M. Douglas, Seattle, WA (US); Rachel Sirkin, Seattle, WA (US); Shikha Devesh Desai, Bellevue, WA (US); Jie Dong, Woodinville, WA (US); Evan W. Lavender, Redmond, WA (US); Christian Harper-Cyr, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/414,374

(22) Filed: May 16, 2019

(65) Prior Publication Data

US 2020/0364199 A1 Nov. 19, 2020

(51) Int. Cl.
*G06F 3/00* (2006.01)
*G06F 16/22* (2019.01)
*G06F 16/2458* (2019.01)
*G06F 16/248* (2019.01)

(52) U.S. Cl.
CPC ........ *G06F 16/2246* (2019.01); *G06F 16/248* (2019.01); *G06F 16/2477* (2019.01)

(58) Field of Classification Search
CPC ............ G06F 16/2246; G06F 16/2477; G06F 16/248
See application file for complete search history.

(56) References Cited

U.S. PATENT DOCUMENTS

| 5,845,257 A | 12/1998 | Fu et al. |
| 5,970,466 A | 10/1999 | Detjen et al. |
| 6,978,271 B1 | 12/2005 | Hoffman et al. |
| 7,305,491 B2 | 12/2007 | Miller et al. |

(Continued)

FOREIGN PATENT DOCUMENTS

| CN | 101145223 A | 3/2008 |
| CN | 101520862 A | 9/2009 |
| CN | 105279637 A | 1/2016 |

OTHER PUBLICATIONS

"Final Office Action Issued in U.S. Appl. No. 16/414,317", dated Jul. 1, 2020, 15 Pages.

(Continued)

*Primary Examiner* — Anil N Kumar
(74) *Attorney, Agent, or Firm* — International IP Law Group, PLLC

(57) ABSTRACT

A method that enables time as data is described herein. The method includes constructing a tree structure, wherein data of the tree structure is a plurality of time intervals, and layers of the tree below a root node comprise identical sibling nodes for layers above a threshold interval length and parent nodes share identical sibling nodes. The method also includes assigning a node identification to each node of the tree structure, wherein each node of the tree structure corresponds to a time interval, and traversing the tree structure to convert a timestamp to a human readable time.

13 Claims, 8 Drawing Sheets

(56) References Cited

U.S. PATENT DOCUMENTS

| | | | |
|---|---|---|---|
| 7,318,040 B2 | 1/2008 | Doss et al. | |
| 7,325,198 B2 | 1/2008 | Adcock et al. | |
| 7,689,448 B2 | 3/2010 | Fu et al. | |
| 7,830,751 B2 | 11/2010 | Parees et al. | |
| 8,295,126 B2 | 10/2012 | Wood et al. | |
| 8,375,292 B2 | 2/2013 | Coffman et al. | |
| 8,434,026 B2 | 4/2013 | Stewart et al. | |
| 8,538,992 B1 | 9/2013 | Lawyer et al. | |
| 8,607,250 B2 | 12/2013 | Oral et al. | |
| 8,713,435 B2 | 4/2014 | Guan et al. | |
| 9,195,972 B2 | 11/2015 | Gopinath et al. | |
| 9,438,649 B2 | 9/2016 | Tallett | |
| 9,843,895 B2 | 12/2017 | Huang et al. | |
| 10,032,135 B2 | 7/2018 | Siu et al. | |
| 10,140,324 B2* | 11/2018 | Massarella | G06F 16/2264 |
| 10,521,084 B2 | 12/2019 | Anzures et al. | |
| 10,586,216 B2 | 3/2020 | Miller et al. | |
| 10,769,132 B1* | 9/2020 | Sharif | G06F 16/2365 |
| 2003/0088427 A1 | 5/2003 | Elsey et al. | |
| 2004/0104937 A1 | 6/2004 | An | |
| 2006/0136121 A1 | 6/2006 | Eisen | |
| 2007/0005409 A1 | 1/2007 | Boss et al. | |
| 2007/0150502 A1 | 6/2007 | Bloebaum et al. | |
| 2007/0180375 A1 | 8/2007 | Gittelman et al. | |
| 2007/0180377 A1 | 8/2007 | Gittelman et al. | |
| 2007/0186193 A1 | 8/2007 | Curran | |
| 2008/0022201 A1 | 1/2008 | Chen et al. | |
| 2008/0059618 A1 | 3/2008 | May et al. | |
| 2008/0162234 A1 | 7/2008 | Lu et al. | |
| 2009/0040875 A1 | 2/2009 | Buzescu et al. | |
| 2009/0112986 A1 | 4/2009 | Caceres et al. | |
| 2009/0168609 A1 | 7/2009 | Weir et al. | |
| 2010/0075648 A1 | 3/2010 | Matsuoka et al. | |
| 2010/0162105 A1 | 6/2010 | Beebe et al. | |
| 2010/0175001 A1 | 7/2010 | Lazarus et al. | |
| 2010/0330974 A1 | 12/2010 | Balannik et al. | |
| 2011/0216628 A1 | 9/2011 | Nalla et al. | |
| 2011/0252351 A1 | 10/2011 | Sikora et al. | |
| 2011/0305437 A1 | 12/2011 | Sakaguchi et al. | |
| 2012/0084286 A1 | 4/2012 | Hubner et al. | |
| 2012/0197900 A1* | 8/2012 | Mandre | G06F 16/2246 707/743 |
| 2012/0233563 A1 | 9/2012 | Chakra et al. | |
| 2014/0047312 A1* | 2/2014 | Ruble | G06F 16/50 715/212 |
| 2014/0074536 A1 | 3/2014 | Meushar et al. | |
| 2014/0136263 A1 | 5/2014 | Lee et al. | |
| 2014/0156597 A1 | 6/2014 | Hakami et al. | |
| 2014/0365951 A1 | 12/2014 | Fernandes et al. | |
| 2015/0156026 A1* | 6/2015 | Gault | H04L 9/3265 713/178 |
| 2015/0178690 A1 | 6/2015 | May et al. | |
| 2015/0199077 A1 | 7/2015 | Zuger et al. | |
| 2015/0268839 A1 | 9/2015 | Tallett | |
| 2015/0294273 A1 | 10/2015 | Barraci et al. | |
| 2015/0347982 A1 | 12/2015 | Jon et al. | |
| 2015/0378619 A1 | 12/2015 | Maeda et al. | |
| 2015/0379476 A1 | 12/2015 | Chaudhri et al. | |
| 2016/0104119 A1 | 4/2016 | Von hessberg et al. | |
| 2016/0189111 A1 | 6/2016 | Bookalill et al. | |
| 2016/0203444 A1 | 7/2016 | Frank et al. | |
| 2016/0259761 A1 | 9/2016 | Laborczfalvi | |
| 2016/0275458 A1 | 9/2016 | Meushar et al. | |
| 2016/0350721 A1 | 12/2016 | Comerford et al. | |
| 2016/0364698 A1 | 12/2016 | Bouz et al. | |
| 2016/0370985 A1 | 12/2016 | Tallett | |
| 2017/0024705 A1 | 1/2017 | Richardson et al. | |
| 2018/0077542 A1 | 3/2018 | Xie et al. | |
| 2018/0089632 A1 | 3/2018 | Singh et al. | |
| 2018/0095938 A1 | 4/2018 | Monte | |
| 2018/0114198 A1 | 4/2018 | Ghotbi et al. | |
| 2018/0189744 A1 | 7/2018 | Frank et al. | |
| 2018/0336532 A1* | 11/2018 | Hillery | G06Q 10/06314 |
| 2019/0121994 A1 | 4/2019 | Embiricos et al. | |
| 2020/0363910 A1 | 11/2020 | Engrav et al. | |
| 2020/0364673 A1 | 11/2020 | Engrav et al. | |

OTHER PUBLICATIONS

"Notice of Allowance Issued in U.S. Appl. No. 14/220,386", dated May 6, 2016, 18 Pages.

"Final Office Action Issued in U.S. Appl. No. 15/256,666", dated Apr. 23, 2019, 14 Pages.

"Non Final Office Action Issued in U.S. Appl. No. 15/256,666", dated Nov. 16, 2018, 11 Pages.

Masoodian, et al., "A Comparison of Linear and Calendar Travel Itinerary Visualizations for Personal Digital Assistants", In Proceedings of the OZCHI, the CHISIG Annual Conference on Human-Computer Interaction, Nov. 20, 2004, 10 Pages.

"Non Final Office Action Issued in U.S. Appl. No. 16/414,317", dated Jan. 7, 2020, 15 Pages.

Hinnant, Howard, "chrono-Compatible Low-Level Date Algorithms", Sep. 7, 2013, pp. 1-24.

"Non Final Office Action Issued in U.S. Appl. No. 16/414,317", dated Oct. 27, 2020, 16 Pages.

"International Search Report and Written Opinion Issued in PCT Application No. PCT/US2020/028027", dated Jul. 20, 2020, 11 Pages.

"International Search Report and Written Opinion Issued in PCT Application No. PCT/US2020/028029", dated Jul. 23, 2020, 11 Pages.

"Non Final Office Action Issued in U.S. Appl. No. 16/414,367", dated Jan. 13, 2021, 17 Pages.

"International Search Report and Written Opinion Issued in PCT Application No. PCT/US20/028030", dated Jun. 2, 2020, 11 Pages.

"Notice of Allowance Issued in U.S. Appl. No. 16/414,317", dated Mar. 16, 2021, 9 Pages.

"Notice of Allowance Issued in U.S. Appl. No. 16/414,367", dated Mar. 12, 2021, 16 Pages.

"Behavior and format of the date and time field", Retrieved from: https://docs.microsoft.com/en-US/previous-versions/dynamicscrm-2016/administering-dynamics-365/dn946904(v=crm.8)?redirectedfrom=MSDN, Nov. 28, 2016, 10 Pages.

"Using Date, Date/Time, and Time Values in Formulas", Retrieved from: https://help.salesforce com/articleView?id=sf.formula_using_date_datetime.htm&type=5, Retrieved Date: Feb. 11, 2021, 4 Pages.

"Google Calendar", Retrieved from: https://www.google.com/calendarlabout/. Retrieved Date: Feb. 11, 2021, 2 Pages.

Agnantis, et al., "Intelligent Calendar Applications: A Holistic Framework based on Ontologies", In International Journal of Artificial Intelligence, vol. 14, Issue 2, Oct. 2016, 21 Pages.

Cranshaw, et al., "Calendar.help: Designing a Workflow-Based Scheduling Agent with Humans in the Loop", In Repository of arXiv:1703.08428v1, Mar. 24, 2017, 12 pages.

Krzywicki, et al., "Closed Pattern Mining for the Discovery of User Preferences in a Calendar Assistant", In Book of Mew Challenges in Applied Intelligence Technologies, Jan. 2008, 11 Pages.

\* cited by examiner

TIME SYSTEMS AS DATA

BACKGROUND

The present disclosure relates to representations of time. In particular, the present disclosure relates to representing time as data.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a method is described. The method includes constructing a tree structure, wherein data of the tree structure is a plurality of time intervals, and layers of the tree below a root node comprise identical sibling nodes for layers above a threshold interval length and parent nodes share identical sibling nodes. The method also includes assigning a node identification to each node of the tree structure, wherein each node of the tree structure corresponds to a time interval, and traversing the tree structure to convert a timestamp to a human readable time.

In another embodiment described herein, an electronic device is described. The electronic device includes a database comprising a tree structure, wherein data of the tree structure is a plurality of time intervals, and layers of the tree below a root node comprise identical sibling nodes for layers above a threshold interval length and parent nodes share identical sibling nodes. The electronic device also includes a node identifier to assign a node identification to each node of the tree structure, wherein each node of the tree structure corresponds to a time interval. Finally, the electronic device includes a tree traverser to traverse the tree structure to convert a timestamp to a human readable time.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
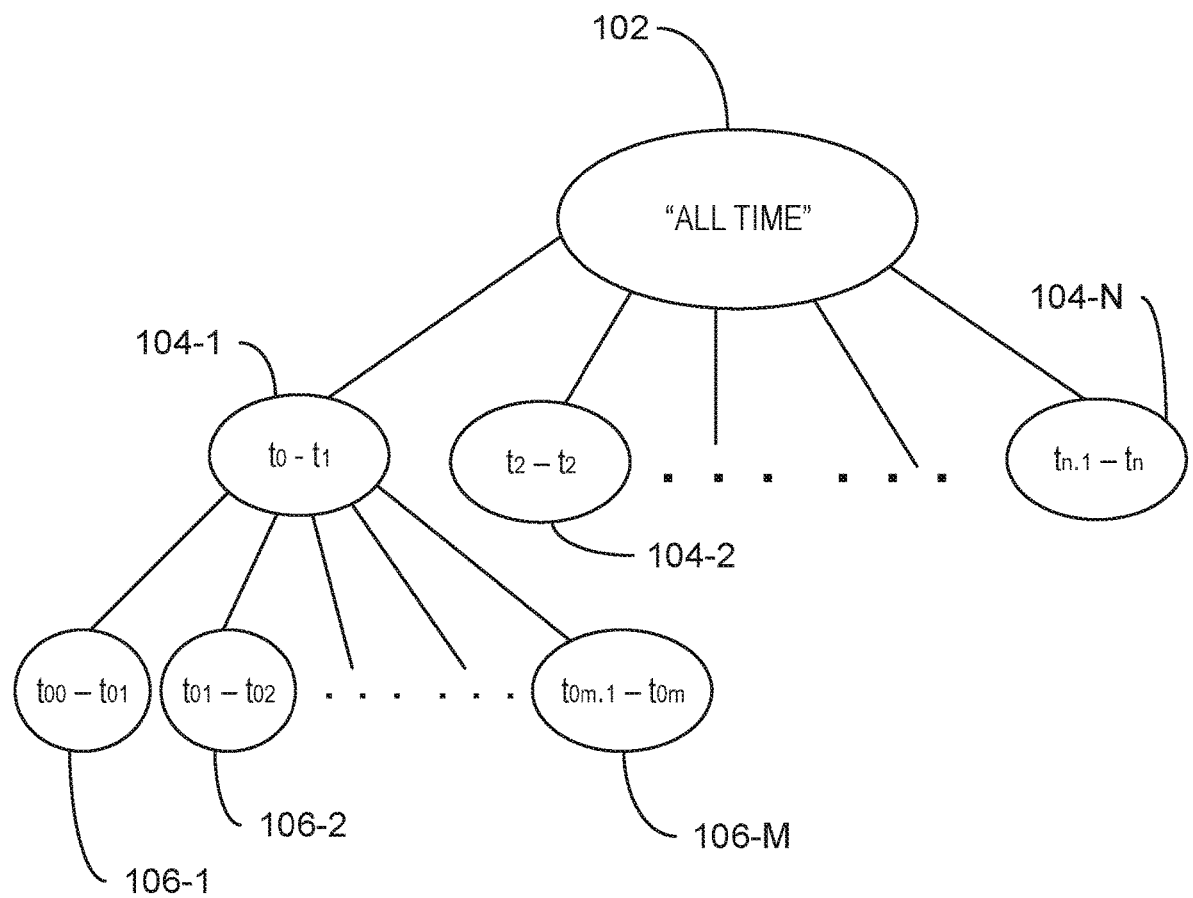
FIG. 1 is a tree structure with all time as data.

Generally, time is an irreversible sequence of existence. Humans use various calendar systems to measure time, both past time values and present time values. Electronic devices are configured with a concept of time, typically referred to as system time that is measured by a system clock. Thus, the system time is representative of the passing of time at an electronic device. Systems generally represent system time primarily as the amount of time (or ticks) past a particular epoch. For example, computing systems often use 12:00 AM UTC, Jan. 1, 1970 as an epoch start, and 1 second as a tick mark. Traditionally, human readable time is calculated by taking this tick mark and applying a set of predefined equations to produce the human readable time.

Humans represent time using calendar systems. For ease of description, the present techniques are illustrated referencing a particular human readable calendar system, such as the Gregorian calendar system. However, the present techniques are not limited to a particular calendar system. The calendar systems used may include lunar, solar, religious or National calendars. Other calendar systems that may be used according to the present techniques include, but are not limited to, the Julian calendar system, Islamic calendar system, Hindu calendar system, Buddhist calendar system, Hebrew calendar system, Baha'i calendar system, and any combination thereof.

A second is a base unit of time derived from the rotation of the Earth. Other measures of time, such as minutes, hours, days, and years are based on the revolution/rotation of the Earth. Variability in the rotation/revolution of the Earth results misalignment between the actual time as presented by movement of the Earth and human readable time as organized by calendar systems. Leap values, such as a leap second, leap day, and a leap year, serve as a correction mechanism added to the human calendars to compensate for variation in the Earth's rotation, including the gradual slowing of rotation. Leap values are added as needed to keep human readable time synchronized with the rotation of the planet.

The inconsistencies in human readable time can overwhelm the equations used by electronic devices to maintain system time. Moreover, general calculations used to realize system time often expect perfect, cyclical periods of time. These expectations often make it difficult to enable conversions between system time to particular representations of human readable time. These representations include daylight savings time or other calendar systems with values that change often, such as the Japanese calendar system.

The present techniques enable time as data. In embodiments, time can be stored in a table format indexed on seconds of an epoch. By representing time via the table indexed on the epoch, the table may be queried to retrieve an associated label. In embodiments the label is descriptive and is immediately understood by humans. The label may be, for example, a year, month, a day, or a particular date. In embodiments, to obtain the table of time, various periods of time are represented by a tree structure. The tree structure may be compressed, and querying the tree structure includes finding a node that corresponds to the number of seconds passed the epoch.

Figure 7:
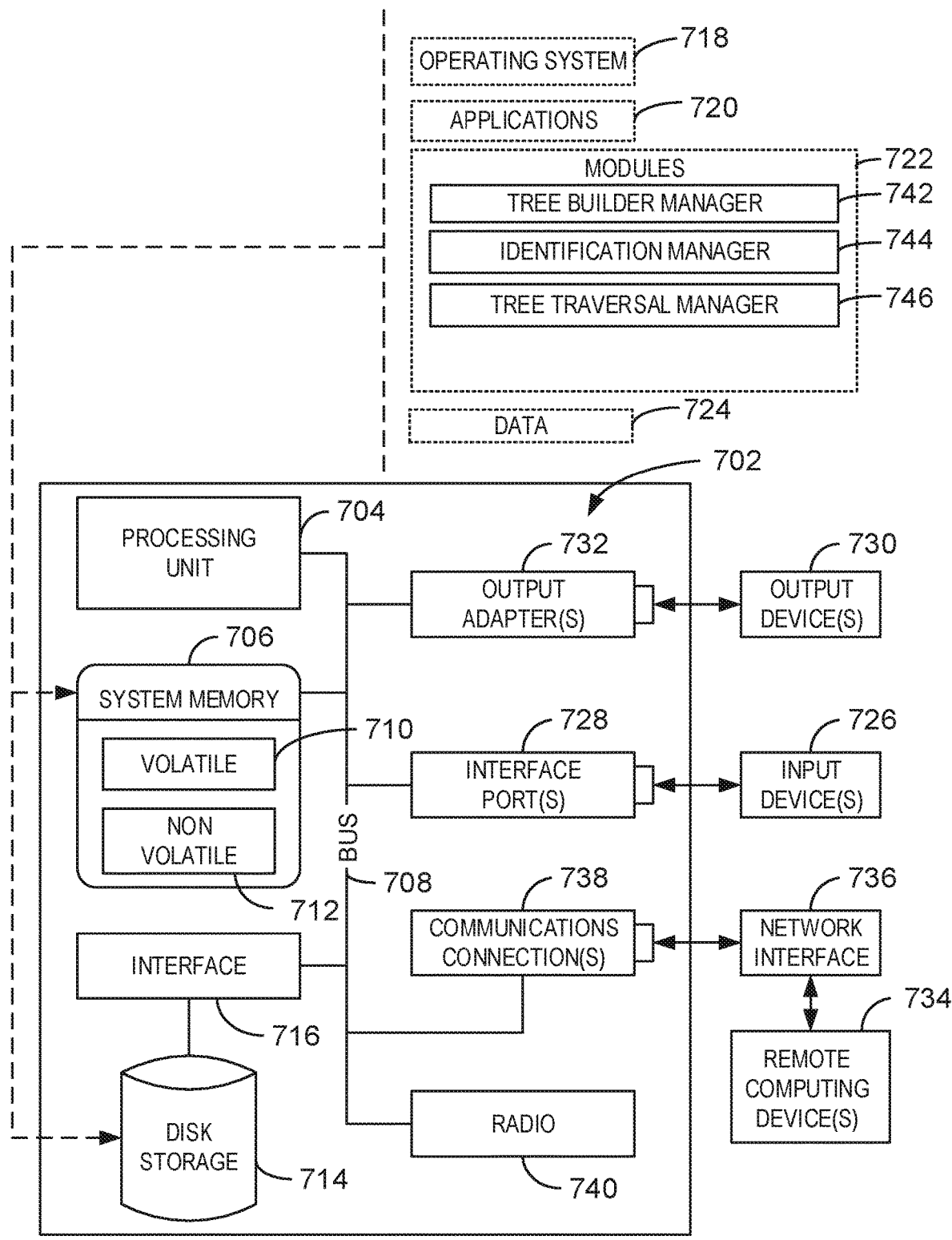
FIG. 7 is a block diagram of an example of a computing system that can enable a time as data.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 7 discussed below, provides details regarding different systems that may be used to implement the functions shown in the figures.

Other figures may describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, medium, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like. The communication media may include cables, such as fiber optic cables, coaxial cables, twisted-pair cables, and the like. Moreover, transmission media for wireless signals may include hardware that enables the transmission of wireless signals such as broadcast radio waves, cellular radio waves, microwaves, and infrared signals. In some cases, the transmission media for wireless signals is a component of a physical layer of a networking stack of an electronic device.

As discussed above, computing systems generally represent system time primarily as the amount of ticks past a particular epoch. For example, some computing systems use 12:00 AM UTC, Jan. 1, 1970 as an epoch start, and one second as a tick mark. Traditionally the time is calculated by taking this tick mark and applying a set of predefined equations to produce the human readable time. In embodiments, the number of tick marks may be referred to as a timestamp.

Consider a timestamp with a value in seconds representing the number of ticks since the epoch. The number of days since the epoch can be found by dividing the number of seconds since the epoch $t_{second}$ by the number of seconds in a day. There are 86,400 seconds in a day disregarding leap seconds and daylight savings time.

$$\text{Let } t_{day} = \frac{t_{second}}{86400}$$

$$\text{Let } t_{secondOfDay} = t_{second} \bmod 86400$$

The number of days $t_{day}$ is determined using integer division. If $t_{second}$ is the number of seconds past midnight of an epoch such as Jan. 1, 1970, $t_{day}$ is the number of days past Jan. 1, 1970. The number of days between Jan. 1, 1 AD and the epoch Jan. 1, 1970 is 719468. Note that the Gregorian calendar is indexed on 1 AD, there is no 0 AD or 0 BC, it goes straight from 1 BC to 1 AD. The year, month, and day of a system timestamp may be calculated from $t_{day}$. The hour, minute, and second of a system timestamp may be calculated from $t_{secondOfDay}$.

To calculate $t_{day}$ and $t_{secondOfDay}$, a time period called an era is found. In the example of the Gregorian calendar, an era is 400 years in length and is a smallest repeatable unit of time in the Gregorian calendar system. Recall that the Gregorian calendar system is referred to here for ease of description, however any calendar system may be used.

Years of the Gregorian calendar are not repeatable, because every four years a leap year occurs. Similarly, groups of four years are not repeatable, because every century, according to the Gregorian calendar, a leap year is skipped. Centuries do not repeat, because every four centuries the previous rule (the rule of skipping a leap year every century) is voided and a leap year is indeed added. Accordingly, in the Gregorian calendar a determination of the particular era is used to determine the smallest repeatable unit of time to which a timestamp belongs.

To determine an era of a timestamp, the number of days between Jan. 1, 1 AD and the epoch Jan. 1, 1970 may be added to the number of days past Jan. 1, 1970 $t_{day}$ to obtain the number of days past Jan. 1, 1 AD corresponding to the timestamp.

$$t_{daysSince1AD} = t_{day} + 719468$$

To determine the era, divide the number of days past Jan. 1, 1 AD $t_{daysSince1AD}$ by the number of days per era, which is a consistent 146097.

$$t_{era} = \frac{t_{dayssince1AD}}{146097}$$

The floor of $t_{era}$ results in the era for a timestamp. For example, a timestamp of 1553808563 corresponds to Thursday, Mar. 28, 2019 9:29:23 PM GMT. Using the equations above, $$t_{day} = \frac{t_{second}}{86400} = 17983$$

and $t_{secondOfDay} = t_{second}$ mod 86400=77363. The number of days the number of days past Jan. 1, 1 AD is $t_{daysSince1AD} = t_{dayOfEpoch} + 719468 = 737451$. Finally, the era is found by $$t_{era} = \frac{t_{daysSince1AD}}{146097} = \sim 5.04.$$

Here, the division is decimal division. If the result of decimal division in calculating $t_{era}$ is less than 0, the additional steps involving the floor function are applied to calculation of $t_{era}$. Thus, the era corresponding to the date of Thursday, Mar. 28, 2019 9:29:23 PM GMT is 5, which is the 5$^{th}$ era since 1 AD (multiply 5*400 and you get 2000).

To determine the day of the era, the remainder of the number of days the number of days past Jan. 1, 1 AD is $t_{daysSince1AD}$ divided by 146097 is found as follows.

$$t_{dayOfEra} = t_{daysSince1AD} \text{ mod } 146097$$

In the particular example of timestamp of 1553808563, $t_{dayOfEra} = t_{daysSince1AD}$ mod 146097=6966.

The year of the era is obtained using a function $f$ that accounts inconsistent years the form of leap years. The function $f$ is derived to calculate the year of the era from $t_{dayOfEra}$. If $$f(t_{dayOfEra}) = \frac{t_{dayOfEra}}{365},$$

the particular day found is correct for the first 1460 days of an era. Put another way, the $f(t_{dayOfEra})$ has an accurate domain of [0, 1459] and a codomain of [0, 3]. However, there are 1461 (365*4+1) days for the first 4 years (recall that an era starts March 1 of a leap year). To compensate for the additional leap day, set $f(1460)=3$ and $f(1461)=4$, as 1460 is the last day of the 3rd year and 1461 is the first day of the 4th year (recall that we're 0 indexed).

Three compensator functions are derived as follows:

$$a(t_{dayOfEra}) = \frac{t_{dayOfEra}}{1460}$$

$$b(t_{dayOfEra}) = \frac{t_{dayOfEra}}{36524}$$

$$c(t_{dayOfEra}) = \frac{t_{dayOfEra}}{146096}$$

Each compensator function a, b, and c enables compensation for leap years that occur during an era. The compensator function a, enables accuracy of the $f(t_{dayOfEra})$ for 100 years, or the domain of [0, 36523] with a codomain of [0, 99]. However, $f(36524)$ yields 99, whereas it should be 100. Thus, additional compensation is enabled by compensator function b, which enables accuracy of the $f(t_{dayOfEra})$ except for the last day of the era. Without additional compensation, the domain of $f(t_{dayOfEra})$ is [0, 146095] and the codomain is [0, 399]. In particular, the last day of an era $f(146096)$ should yield 399. However, as the last day of the era yields 400 with only compensator functions a and b. Compensator function c subtracts a day, and results in a final year of the era function $f(t_{dayOfEra})$ as follows.

$$f(t_{dayOfEra}) = \frac{t_{dayOfEra} - a(t_{dayOfEra}) + b(t_{dayOfEra}) - c(t_{dayOfEra})}{365}$$

With this out of the way, let's call $f$ on $t_{dayOfEra}$, for the particular example of $t_{second}$=1553808563:

$$t_{yearOfEra} = f(t_{dayOfEra}) = \frac{t_{dayOfEra} - a(t_{dayOfEra}) + b(t_{dayOfEra}) - c(t_{dayOfEra})}{365}$$

$$a(t_{dayOfEra}) = \frac{t_{dayOfEra}}{1460} = \frac{6966}{1460} = 4$$

$$b(t_{dayOfEra}) = \frac{t_{dayOfEra}}{36524} = \frac{6966}{36524} = 0$$

$$c(t_{dayOfEra}) = \frac{t_{dayOfEra}}{146096} = \frac{6966}{36524} = 0$$

$$f(t_{dayOfEra}) = f(6966)$$

$$f(t_{dayOfEra}) = \frac{6966 - a(6966) + b(6966) - c(6966)}{365}$$

$$f(t_{dayOfEra}) = \frac{6966 - 4 + 0 + 0}{365}$$

$$f(t_{dayOfEra}) = \frac{6962}{365}$$

$$f(t_{dayOfEra}) = 19$$

Which is correct since the start of the era was 2000, and the year of the era is 19.

The above sentence is the key to deriving the year from $t_{yearOfEra}$, which is simply to multiply $t_{era}$ by 400 (recalling that 400 is the number of years per era), and add $t_{yearOfEra}$ to the result.

$$t_{year} = t_{yearOfEra} + (400 * t_{era})$$
$$= 19 + (400 * 5)$$
$$= 19 + 2000$$
$$= 2019$$

The day of the year can also be derived by constructing another function using two parameters, $t_{dayOfEra}$ and $t_{yearOfEra}$. Here, mod the years of the day in order to acquire the day of the year. However, leap years should be accounted for, as well as the lack of the leap year for every century other than the first century of the era. Thus, the function will add a day for every four years and subtract a day for every 100 years resulting in the following:

$$f(t_{yearOfEra}, t_{dayOfEra}) = t_{dayOfEra} - (365 * t_{yearOfEra} + a(t_{yearOfEra}) - b(t_{yearOfEra}))$$

where
With the two compensator functions:

$$a(t_{yearOfEra}) = \frac{t_{yearOfEra}}{4}$$

and $$b(t_{yearOfEra}) = \frac{t_{yearOfEra}}{100}$$

a represents adding a day every four years, b represents subtracting a day every 100 years (thus counteracting a every 100 years). This equation results in a missing day from the first leap year, because the original equation relies on the years being indexed on March $1^{st}$, which makes things easier when dealing with leap years. We'll need to compensate for this later on. To obtain $t_{dayOfYearIndexedOnMarch}$ for the particular example of $t_{second}$=1553808563:

$$a(t_{yearOfEra}) = a(19) = 4$$
$$b(t_{yearOfEra}) = b(19) = 0$$
$$t_{dayOfYear} = f(t_{yearOfEra}, t_{drayOfEra})$$
$$= f(19, 6966)$$
$$= 6966 - (365 * 19 + a(19) - b(19))$$
$$= 6966 - (365 * 19 + 4 - 0)$$
$$= 6966 - 6939$$
$$= 27$$

Thus, $t_{dayOfYearIndexedOnMarch}$=27, indexed on March 1, yielding a day of human readable March 28. Using similar logic, the Gregorian year, month, day, hour, minute, and second can be calculated from the timestamp $t_{second}$=1553808563. In particular, $t_{dayOfYear}$ and $t_{monthOfYear}$ can be derived as indexed on March 1. For $t_{monthOfYear}$, a function is created that takes in $t_{dayOfYearIndexedOnMarch}$, which has a domain of [0, 366] and map it to a codomain of [0, 11]. An inverse function $f^{-1}$ that takes as input $t_{monthOfYearIndexedOnMarch}$ and outputs the starting day of the year (indexed on March $1^{st}$ as well). In particular, the function can be hard coded as follows:

$f^{-1}(0)=0$;

$f^{-1}(1)=31$;

$f^{-1}(2)=61$;

$f^{-1}(3)=92$;

$f^{-1}(4)=122$;

$f^{-1}(5)=153$;

$f^{-1}(6)=184$;

$f^{-1}(7)=214$;

$f^{-1}(8)=245$;

$f^{-1}(9)=275$;

$f^{-1}(10)=306$;

$f^{-1}(11)=337$;

The resulting function is a polynomial that maps as follows:

$$f^{-1}(t_{monthOfYearIndexedOnMarch}) = mt_{monthOfYearIndexedOnMarch} + b.$$

The equation $$f^{-1}(t_{monthOfYearIndexedOnMarch}) = \frac{306 * t_{monthOfYearIndexedOnMarch} + 4}{10}$$

uses Euclidean division. The inverse, $f$, is derived as follows:

$$t_{dayOfYearIndexedOnMarch} = f^{-1}(t_{monthOfYearIndexedOnMarch})$$
$$t_{dayOfYearIndexedOnMarch} = \frac{306 * t_{monthOfYearIndexedOnMarch} + 4}{10}$$
$$t_{monthOfYearIndexedOnMarch} = \frac{10 * t_{dayOfYearIndexedOnMarch} - 4}{306}$$
$$= \frac{5 * t_{dayOfYearIndexedOnMarch} - 2}{153}$$

$$t_{monthOfYearIndexedOnMarch} = f(t_{dayOfYearIndexedOnMarch}) = \frac{5 * t_{dayOfYearIndexedOnMarch} - 2}{153}$$

The result is found as follows:

$$t_{monthOfYearIndexedOnMarch} = f(t_{dayOfYearIndexedOnMarch}) = f(27) = \frac{5 * 27 - 2}{153} = \frac{153}{153} = 0$$

The $t_{monthOfYear}$ may be calculated by checking if $t_{monthOfYearIndexedOnMarch}$ is less than 10. If $t_{monthOfYearIndexedOnMarch}$ is less than 10, 3 is added to $t_{monthOfYearIndexedOnMarch}$. If $t_{monthOfYearIndexedOnMarch}$ is not less than 10, 9 is subtracted from $t_{monthOfYearIndexedOnMarch}$. In this manner, the month of the year is indexed on January, with an index of 1 instead of 0. This calculation is in accordance with Gregorian standard. This check of $t_{monthOfYearIndexedOnMarch}$ will affect the calculation of $t_{year}$.

In the example above, $t_{monthOfYearIndexedOnMarch}$ is 0, so 3 is added.

$t_{monthOfYear}$=0+3=3

The day of the month, $t_{dayOfMonth}$, is derived by simply subtracting the result from $f^{-1}(t_{monthOfYearIndexedOnMarch})$ from $t_{dayOfYearIndexedOnMarch}$, and adding 1. A value of 1 is added given that the Gregorian calendar is 1 indexed, not 0 indexed.

$$t_{dayOfMonth} = t_{dayOfYearIndexedOnMarch} - f^{-1}(t_{monthOfYearIndexedOnMarch}) + 1$$
$$= 27 - f^{-1}(0) + 1$$
$$= 28$$

Finally, the year $t_{year}$ is determined. To calculate the year, the number of years at the start of $t_{era}$ are acquired, and then $t_{era}$ is multiplied by the number of years per era, or 400, and this result is added to $t_{yearOfEra}$. A check is performed to see if $t_{monthOfYear}$ less equal is than or to 2. If $t_{monthOfYear}$ is less than or equal to 2, a value of 1 is added to the result to compensate for the calculations based the use of March as an index. In the present example, $t_{monthOfYear} > 2$, so 1 is not added to the calculation of $t_{year}$.

$$t_{year} = t_{era} * 400 + t_{yearOfEra} + 0$$
$$= 5 * 400 + 19$$
$$= 2019$$

In this manner, the year, month, and day are obtained as 2019, 3, and 28, respectively. To acquire the hour, minute, and second, recall the value $t_{secondOfDay}$. Note that there are 3600 seconds per hour (ignoring leap seconds), so to calculate $t_{hour}$, the seconds of the day $t_{secondOfDay}$ are divided by 3600. Following the previous example, $$t_{hour} = \frac{t_{secondOfDay}}{3600} = \frac{77363}{3600} = 21.$$

The remained of the integer division in calculating $t_{hour}$ is added to the seconds of the hour $t_{secondOfHour}$. Following the previous example, $t_{secondOfHour} = t_{secondOfDay}$ mod 3600=77363 mod 3600=1763.

Recalling there are 60 seconds to a minute, $t_{secondOfHour}$ may be divided by 60, and determined as follows:

$$t_{minuteOfHour} = \frac{t_{secondOfHour}}{60} = \frac{1763}{60} = 29$$

The remainder of the integer division used to calculate $t_{minuteOfHour}$ is assign the seconds of the minute, $t_{secondsOfMinute}$. Following the previous example:

$t_{secondOfMinute} = t_{secondOfHour}$ mod 60=1763 mod 60=23.

Accordingly, the hour, minute, and second values is are calculated as 21, 29, and 23, respectively. Thus, using the above example, the Gregorian year, month, day, hour, minute, and second are calculated from an initial value of $t_{secondOfEpoch}$=1553808563, turning out to be 2019/03/28, 21:29:23.

Calculations to convert timestamps to human readable time, such as those described above, ignore the concept of leap seconds as a compensation for inconsistent real-world time. Different electronic systems are equipped with varying techniques to compensate for leap seconds in a number of different ways. For example, when a leap second is announced some systems are configured to increase the length of a second by a small amount of time, fitting 86401 seconds in the space of 86400. Other systems simply repeat the second, while other systems freeze the time for the duration of a real-world second. However, these approaches all make it appear as though nothing ever happened, so querying the time system will deceive the user, showing there to only be 86400 seconds in that day, whereas there were 86401. By contrast, the present techniques structure time as data by configuring time as a tree structure. In particular, the present techniques use cycles presented by calendar systems to compress a tree structure with "All-Time" as data to a manageable number of nodes. Non-cyclical nodes in the tree may be further compressed into a linear data structure, such as a table.

FIG. 1 is a tree structure 100 with all time as data. In FIG. 1, root node 102 represents All-Time. The second level 104 of tree 100 represents one billion-year units of time. Thus, each node represents a billion-years, and each node is exactly alike but for the real-world time period the node represents. Each of node 104-1, node 104-2 . . . 104-N represents a time period of one billion-years. Each billion-year node can be further divided into a number of 100 million-year notes. Accordingly, the third level 106 of tree 100 includes a plurality of nodes, where each node represents 100 million-years. Each of node 106-1, node 106-2 . . . 106-M represents a time period of 100 million-years. For ease of illustration, the tree 100 illustrates three levels of hierarchical time data. However, the table may have any number of layers with nodes that further divide time into increasingly smaller intervals.

Accordingly, the tree structure 100 may continue with child nodes that replicate across all time down to units of 10,000 years. For nodes with intervals greater than 10,000 years, the intervals are identical. Further, the tree 100 layer of nodes with intervals of 10,000-year blocks of time are also all identical. In the Gregorian calendar system, the arrangement of time causes time periods of less than 400 years to exhibit non-cyclical behavior due to the correction employed by leap values. Since 10,000 is evenly divisible by 400, a 10,000-year block of time is cyclical. However, a 1,000-year block of time is not cyclical since it is not evenly divisible by 400. As a result, for nodes of the tree that have intervals below 10,000 years, every other millennium has a different amount of days due to leap days. Thus, to divide the 10,000-year nodes, two types of nodes are defined—leap or normal—and the nodes of the millennia layer are not identical. Construction of the tree may continue down to years having 12 children of 28, 29, 30, or 31 days, after which the division of time results in consistent 24-hour nodes, each with 60-minute nodes, each with 60 second nodes. For ease of description, the present techniques are described using the Gregorian calendar system as an example. However, the present techniques may apply to any calendar system. Each calendar system may have a threshold interval size, wherein intervals less than this threshold interval size cease to be identical intervals. In the example of the Gregorian calendar system, this value is a multiple of 400.

Thus, time may be configured as a hierarchical tree structure, where each node has a time value and references to children nodes. In particular, the root node corresponds to all time. Each level includes a plurality of nodes that generally correspond to the same time unit. In most circumstances, sibling nodes are identical. However, for some sibling nodes leap values are applied rendering slight differences in time units of certain nodes. A cousin node may match other cousin nodes, where a cousin node is a node of the same layer with a different parent node.

The tree 100, which intervals of time in seconds, may be queried using the number of seconds since the epoch $t_{second}$, and searching for the billion-year node that contains it. The children nodes underneath the found billion-year node may be queried to determine which 100 million-year node contains it, and so on. The complexity of this search is O(log (n)), but given that the height and width of the tree is limited, it is for all intents and purposes O(1). Storing the data for an "All-time" tree in memory is unfeasible. Accordingly, the tree may be compressed using a linear data structure, such as a table.

In particular, each node is assigned an identification (ID) in a table that contains all of the node's information. For example, Table 1 below illustrates node IDs for nodes illustrated in FIG. 2.

TABLE 1

| ID | Node |
|---|---|
| 0 | All-Time |
| 1 | $t_0$-$t_1$ |
| 2 | $t_1$-$t_2$ |
| ... | ... |
| N | $t_{n-1}$-$t_n$ |

Each node is also associated with a label identification (ID). The label ID is a descriptive term that corresponds to the time interval associated with the node. The label may be, for example, a year, month, and day, or a particular date.

The cyclical nature of time data can be used to compress the tree to a manageable count of nodes. Many of these nodes are similar, such that the similar nodes include the same values and data. In embodiments, similar nodes are nodes that correspond to the same interval length. In examples, the billion-year nodes are used as a starting point for compression, as the root node of "All Time" is largely conceptual. However, in embodiments billion-year nodes may also be compressed.

The first layer of nodes after the billion-year nodes are 100 million-year nodes. Note that all child nodes of the billion-year nodes match and are identical to their cousin nodes. Instead of repeating cousin nodes over and over again, an ID is assigned to each node listed in the table. Thus, for a set of sibling million-year nodes, the first child's start second is 0, and end second is 3,150,569,520,000,000−1, the second child's start second is 3,150,569,520,000,000, and the end second is 6,301,139,040,000,000−1, and so on. Each billion-year node has the same set of children, with the same time intervals, and follows this pattern. Moreover, each 100 million-year node will have the same set of children, with the same time intervals, and so on.

Figure 2:
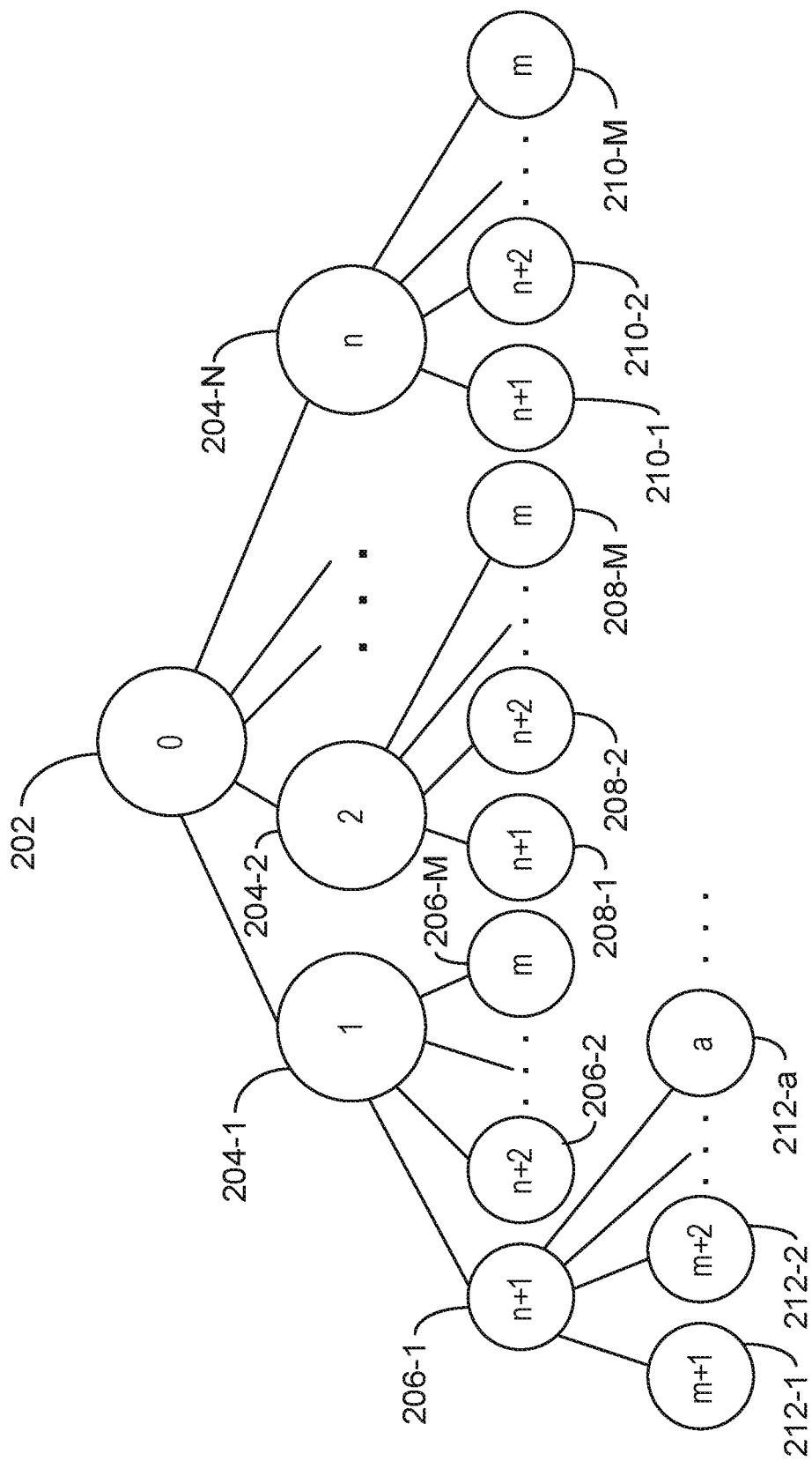
FIG. 2 is a tree structure with cyclic time periods as data.

FIG. 2 is a tree structure 200 with cyclic time periods as data. The Table 1 above corresponds to the tree 200. In embodiments, a root node 202 has an ID of zero. The layer 204 of the tree structure 200 may correspond to a plurality of billion-year nodes. Each billion-year node 204-1, 204-2, through 204-N is a parent of an identical set of sibling 100 million-year nodes in layer 206. Accordingly, the layer 206 includes repeating 100 million-year nodes. In particular, parent node 204-1 with an ID of 1 has child nodes 206-1, 206-2 through 206-M. Parent node 204-2 with an ID of 2 has child nodes 208-1, 208-2 through 208-M. Finally, parent node 204-N with an ID of N has child nodes 210-1, 210-2 through 210-M. Further, each 100 million-year node is a parent of an identical set of sibling 10 million-year nodes. As illustrated, parent node 206-1 with an ID of n+1 has child nodes 212-1, 212-2 through 212-a. This pattern of repeating children occurs down through increasingly smaller time periods until a millennia level of nodes, using the Gregorian calendar system as an example.

Figure 3:
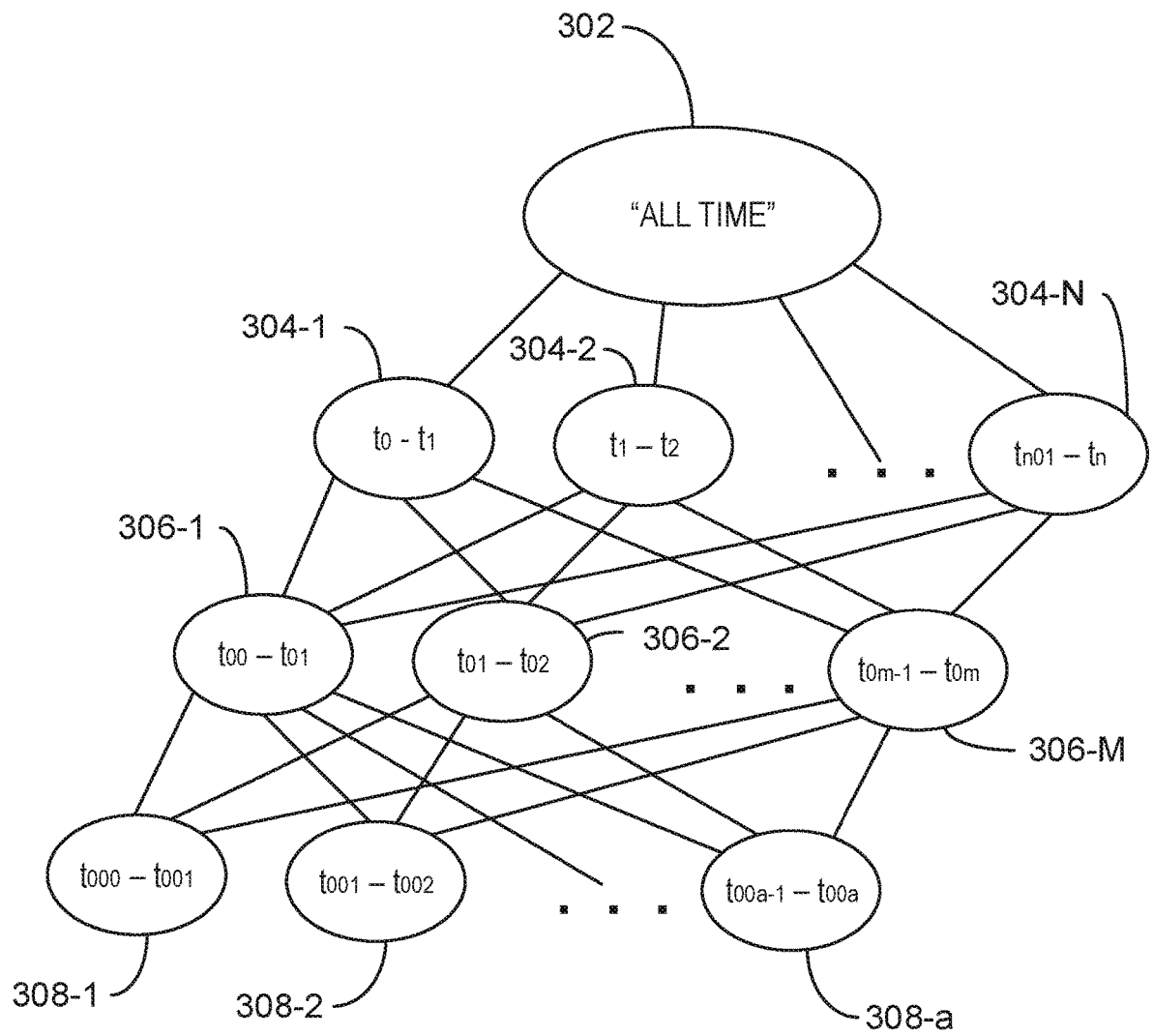
FIG. 3 is a tree structure with time periods as data with shared child nodes.

Due to the repeating nature of large time periods as described above, instead of each node having its own set of children, all nodes share their children with their sibling nodes. The sharing of nodes results in a compression of a table of nodes and IDs down to a single column. FIG. 3 is a tree structure 300 with time periods as data with shared child nodes. As illustrated, the root node 302 represents all time. The layer 304 of the tree structure 300 may correspond to billion-year nodes. The layer 306 of the tree structure 300 may correspond to 100 million nodes. The layer 308 may correspond to 10 million-year nodes.

As illustrated, each billion-year node 304-1, 304-2, through 304-N shares sibling nodes 306-1, 306-2 through 306-M. Moreover, each 100 million-year node 306-1, 306-2, through 306-M shares sibling nodes 308-1, 308-2, through 308-A. This configuration of repeatable periods of time as a tree structure with shared siblings results in a manageable count of data nodes. Moreover, to compensate for leap values, the repeating nature of larger time periods can be exploited. In particular, a time node of a tree structure according to the present techniques has start and end times of $t_{startSecond}$ and $t_{endSecond}$, with $t_{startSecond} < t_{endSecond}$. The definition of before, containing, and after with regard to a time node are as follows: (1) A time node is before a second $t_{second}$ if and only if $t_{endTime} < t_{second}$; (2) A time node contains a second $t_{second}$ if and only if $t_{startSecond} \leq t_{second} \leq t_{endSecond}$; and (3) A time node is after a second $t_{second}$ if and only if $t_{endSecond} < t_{second}$. Moreover, the length of a node N is $t_{endSecond} - t_{startSecond} + 1$.

To query a tree structure with time periods as data with shared child nodes, an offset is used to traverse the tree using a tree search algorithm. For example, consider the $t_{second}$ used earlier to obtain a human readable date from a timestamp. Recall $t_{second} = 1553808563$. In this example, set a node variable, N, to the "All-time" node. In embodiments, the "All-time" node serves an entry point for querying the tree. The "All-Time" node is all encompassing, from −8.64 quadrillion seconds to 8.64 quadrillion seconds. Thus, the "All-Time" node includes $t_{second}$.

Next, the billion-year node that contains $t_{second}$ is found. In embodiments, the tree traversal iterates through the set of nodes under "All time" until the node that contains $t_{second}$ is discovered. If the nodes are ordered, a binary search may be performed to discover the billion-year node that includes $t_{second}$. As described above, the billion-year nodes according to the present techniques have absolute time, and are not using the compression techniques of smaller nodes. A node with $t_{startSecond}$ of −62167219200 and $t_{endSecond}$ of 31556889832780799 includes $t_{second} = 1553808563$. Note that the value $t_{startSecond} = -62167219200$ is the first second of 1 AD, per the Gregorian calendar.

The variable $t_{offset}$ is set to the start time of the current billion-year node. Thus, every node traversed after the current billion-year node will be offset by this time of the current billion-year node. Moreover, N is set to this billion-year node to continue a further query. The current billion-year node (N) has ten 100 million-year nodes under it, the first being from $t_{startSecond} = 0$ to $t_{endSecond} = 3155695199999999$. The offset value $t_{offset}$ which is presently the start time of the current billion-year node is added to the start and end times of the current layer million-year nodes, yielding $t_{adjustedStartSecond} = -62167219200$ and $t_{adjustedEndSecond} = -3155633032780799$. This time node contains $t_{second}$, since $-62167219200 < 1553808563 < 3156633032780799$. The non-modified start time of the node containing the timestamp is added to $t_{offset}$, which is 0. Thus, $t_{offset} = -62167219200$. Set N to this node, and the query repeats at the next layer of nodes. During tree traversal, the start time of a non-root node is relative to the start time of its' parent node. By adding $t_{offset}$, the absolute starting time value is obtained by adding the start time of the parent node.

The 100 million-year node (N) has ten 10 million-year child nodes, the first being from $t_{startSecond}=0$ to $t_{endSecond}=315569519999999$. This node will be selected as N, since the node contains the timestamp. Again, the non-modified start time is added to $t_{offset}$. Querying the tree continues in this manner until a layer of the tree is encountered with 10,000-year nodes. Thus, the following nodes are a portion of nodes found when N is a 10,000 year node with a $t_{startSecond}=0$ and $t_{endSecond}=315569519999$. It has ten millennium children, and the first three children have the following start/end times:

TABLE 2

| Child Node | Node Title | $t_{startSecond}$ | $t_{endSecond}$ | $t_{adjustedStartSecond}$ | $t_{adjustedEndSecond}$ |
|---|---|---|---|---|---|
| $N_0$ | "0" | 0 | 31556995199 | −62167219200 | −30610224001 |
| $N_1$ | "1" | 31556995200 | 63113903999 | −30610224000 | 946684799 |
| $N_2$ | "2" | 63113904000 | 94670899199 | 946684800 | 32503679999 |

Child node $N_2$, when adjusted by the offset $t_{offset}$, contains $t_{second}$, and thus $N_2$ is selected. The $t_{startSecond}$ is added to $t_{offset}$, yielding $t_{offset}=946684800$. Set $N=N_2$.

At this point in the query, N is currently a millennium node with ten century nodes as children. The first child with $t_{startSecond}=0$ and $t_{endSecond}=3155759999$, when adjusted by the offset $t_{offset}$, yields $t_{adjustedStartSecond}=946684800$ and $t_{adjustedEndSecond}=4102444799$, which does include $t_{second}$. Therefore, $t_{startSecond}$ is added to $t_{offset}$ and N is set to this child node ($N_0$). Note that $N_0$ is the first century of this millennium, and continue. The Table 3 below illustrates the current century node N with one-hundred-year nodes as children. A sample of the children of the current century node N is as follows:

TABLE 3

| Child Node | Node Title | $t_{startSecond}$ | $t_{endSecond}$ | $t_{adjustedStartSecond}$ | $t_{adjustedEndSecond}$ |
|---|---|---|---|---|---|
| $N_{18}$ | "18" | 568080000 | 599615999 | 1514764800 | 1546300799 |
| $N_{19}$ | "19" | 599616000 | 631151999 | 1546300800 | 1577836799 |
| $N_{20}$ | "20" | 631152000 | 662774399 | 1577836800 | 1609459199 |

$N_{19}$, when adjusted, clearly contains $t_{second}$. Thus, the table yields the 19$^{th}$ year of the century, which is adjusted by $t_{offset}$ as done previously. Here, $t_{offset}=1546300800$ and set $N=N_{19}$, and continue.

N is now a year node with twelve-month nodes as children. The first four children are as follows:

TABLE 4

| Child Node | Node Title | $t_{startSecond}$ | $t_{endSecond}$ | $t_{adjustedStartSecond}$ | $t_{adjustedEndSecond}$ |
|---|---|---|---|---|---|
| $N_{january}$ | "January" | 0 | 2678399 | 1546300800 | 1548979199 |
| $N_{february}$ | "February" | 2678400 | 5097599 | 1548979200 | 1551398399 |
| $N_{march}$ | "March" | 5097600 | 7775999 | 1551398400 | 1554076799 |
| $N_{april}$ | "April" | 7776000 | 10367999 | 1554076800 | 1556668799 |

The node $N_{march}$ contains $t_{second}$. Thus, the offset is adjusted as $t_{offset}=1551398400$, set $N=N_{march}$, and the query continues to the next level of nodes.

The node N is now a month node with thirty-one-day nodes as children. A sample of the children appear as follows:

TABLE 5

| Child Node | Node Title | $t_{startSecond}$ | $t_{endSecond}$ | $t_{adjustedStartSecond}$ | $t_{adjustedEndSecond}$ |
|---|---|---|---|---|---|
| $N_{26}$ | "27" | 2246400 | 2332799 | 1553644800 | 1553731199 |
| $N_{27}$ | "28" | 2332800 | 2419199 | 1553731200 | 1553817599 |
| $N_{28}$ | "29" | 2419200 | 2505599 | 1553817600 | 1553903999 |

In Table 5, the offset of 1 is intentional, as Gregorian days are indexed using a value of 1, and an array of nodes is 0 indexed. The node $N_{27}$ contains $t_{second}$, and the offset is adjusted $t_{offset}=1553731200$. Set $N=N_{27}$, and the next layer is queried.

The node N is now a day node with twenty-four-hour nodes. A sample of the children appear as follows:

TABLE 6

| Child Node | Node Title | $t_{startSecond}$ | $t_{endSecond}$ | $t_{adjustedStartSecond}$ | $t_{adjustedEndSecond}$ |
|---|---|---|---|---|---|
| $N_{20}$ | "20" | 72000 | 75599 | 1553803200 | 1553806799 |
| $N_{21}$ | "21" | 75600 | 79199 | 1553806800 | 1553810399 |
| $N_{22}$ | "22" | 79200 | 82799 | 1553810400 | 1553813999 |

The node $N_{21}$ contains $t_{second}$, so the offset is adjusted $t_{offset}=1553806800$, set $N=N_{21}$. The query continues to the next layer.

The node N is now an hour node with twelve 5-minute nodes as children. A sample of the children appear as follows:

TABLE 7

| Child Node | Node Title | $t_{startSecond}$ | $t_{endSecond}$ | $t_{adjustedStartSecond}$ | $t_{adjustedEndSecond}$ |
|---|---|---|---|---|---|
| $N_4$ | "20" | 1200 | 1499 | 1553808000 | 1553808299 |
| $N_5$ | "25" | 1500 | 1799 | 1553808300 | 1553808599 |
| $N_6$ | "30" | 1800 | 2099 | 1553808600 | 1553808899 |

$N_5$ contains $t_{second}$, so the offset is adjusted to $t_{offset}=1553808300$, set $N=N_5$, and the query proceeds to the next layer.

N is now a 5-minute node with five one-minute children. The children appear as follows:

TABLE 8

| Child Node | Node Title | $t_{startSecond}$ | $t_{endSecond}$ | $t_{adjustedStartSecond}$ | $t_{adjustedEndSecond}$ |
|---|---|---|---|---|---|
| $N_0$ | "0" | 0 | 59 | 1553808300 | 1553808359 |
| $N_1$ | "1" | 60 | 119 | 1553808360 | 1553808419 |
| $N_2$ | "2" | 120 | 179 | 1553808420 | 1553808479 |
| $N_3$ | "3" | 180 | 239 | 1553808480 | 1553808539 |
| $N_4$ | "4" | 240 | 299 | 1553808540 | 1553808599 |

$N_4$ contains $t_{second}$, and thus the last node, the minute node, is obtained. The following nodes have been acquired in the traversal described above: "All time", "0 billion-year", "0-99 million-year", "0-9 million-year", "0-100,000", "0-10,000", "2", "0", "19", "March", "28", "21", "25", "4".

By deriving the contributions of each node to the particular human readable system, the date of 2019, Mar. 28, 21:00 hours, 25+4 minutes, or 21:29, Mar. 28, 2019, is obtained.

Accordingly, the present techniques can use a tree structure as a compressed table to obtain an accurate date from a timestamp. This structure enables efficient modifications to a table which relies on all branches being the same.

Consider a hypothetical example where the table is modified to include a leap second $t_{leapSecond}$ that is added Dec. 31, 2019 as announced by the International Earth Rotation and Reference Systems Service. The addition of the $t_{leapSecond}$ can cause the replacement of a node. Because any modifications to a node's data affects every node pointing to that data, the modified node is first assigned a new ID. The ID and data are added to the corresponding table, the ID replaces the parent node's previous, outdated, erroneous child. In this manner, the parent now points to the new node, not a modified node.

Figure 4A:
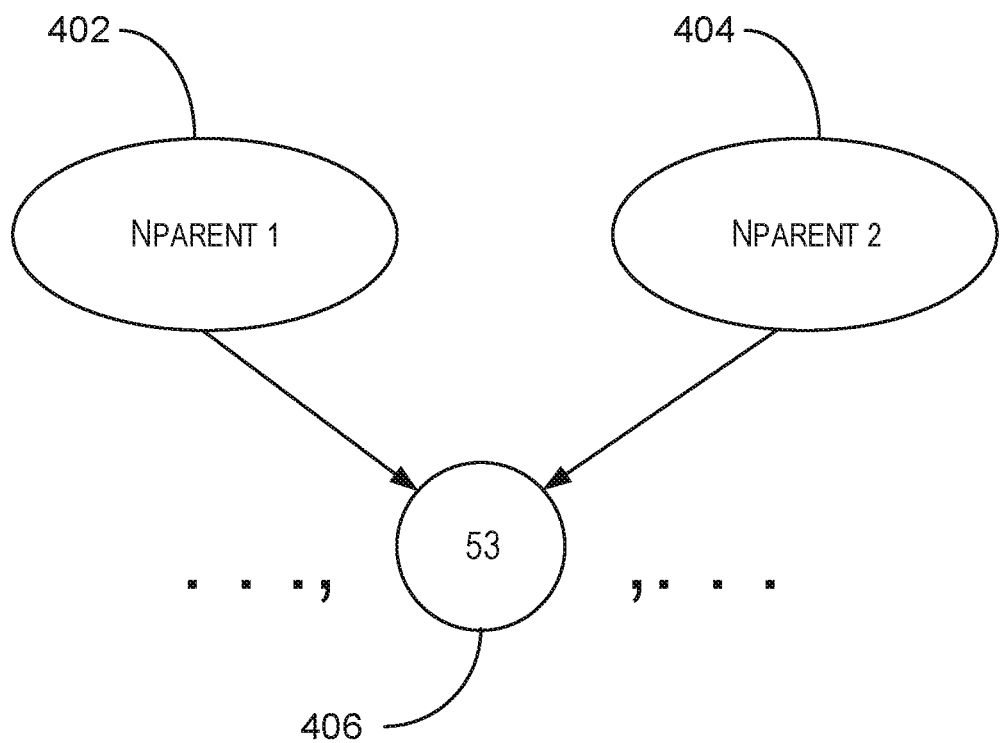
FIG. 4A is an illustration of replacing a node in a tree structure.

FIG. 4A is an illustration of replacing a node in a tree structure. The portion of the tree structure includes two nodes, $N_{parent0}$ 402 and $N_{parent1}$ 404, both of which contain the same set of children. For the purposes of this discussion, assume that these are the base layer, and neither node is modified directly, just their children. The node 406 with an ID of 53 may need to be changed to accommodate modifications to the time. A new node, $N_{new}$, is created and assigned the desired start and end time. In this example, the desired start and end time is likely related to node $N_{53}$'s start and end time in some way. For example, the addition of a leap second may cause the start and end time for $N_{53}$ to increase by one second. The new node, $N_{new}$, is assigned a new ID and is made the parent of the former children of $N_{53}$.

Figure 4B:
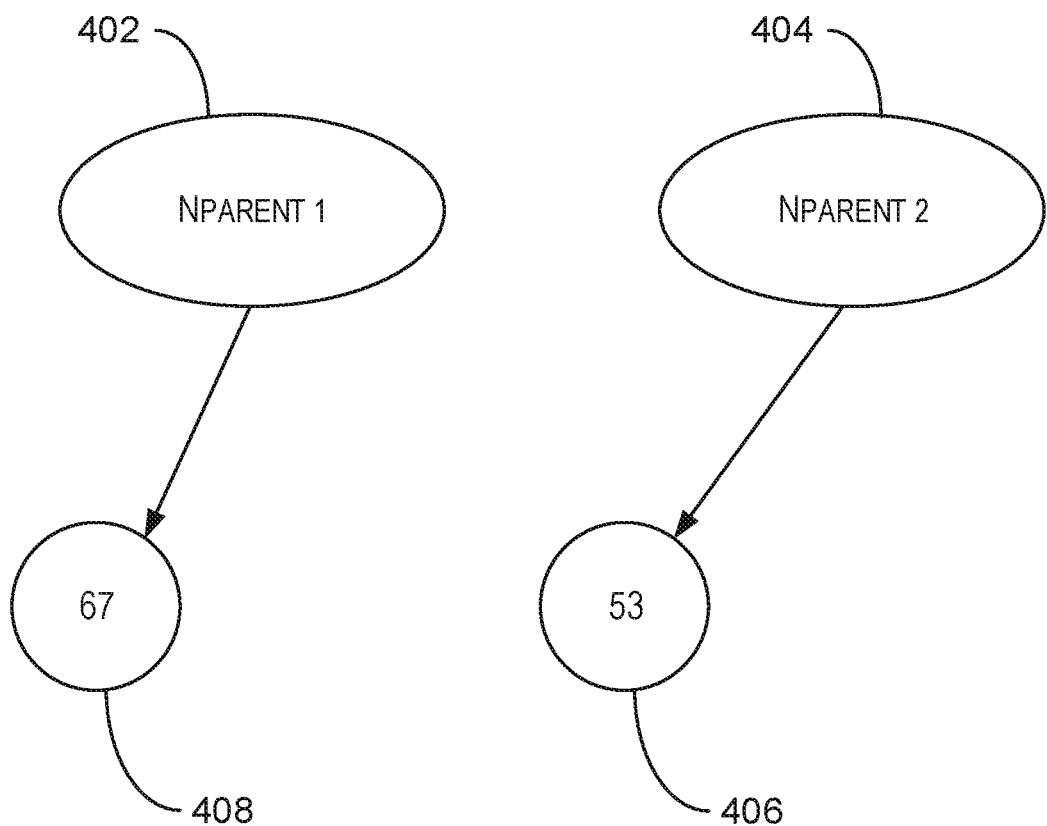
FIG. 4B is an illustration of a replacement node in a portion of a tree structure.

FIG. 4B is an illustration of a replacement node in a portion of a tree structure. Continuing with the example of FIG. 4A, the new node, $N_{new}$, is assigned a new ID of 67 and the set of children previously assigned to node $N_{53}$. Now node 408 $N_{67}$ is added to the table under the index 67. The parent node 402 $N_{parent1}$ is modified to point to this new node. Replacing a node may be referred to as a process called replace($N_{parent}$, $N_{child}$, $N_{new}$), where $N_{parent}$ is a node to be replaced, $N_{child}$ is a child node of $N_{parent}$, and $N_{new}$ is the node to replace $N_{parent}$.

The time nodes in the tree structure described herein fall into three categories, each needing to be approached differently: (1) Nodes before the second, (2) Nodes containing the second, and (3) Nodes after the second, where "the second" is a leap value. During a replacement process of nodes before the second, the nodes can remain the same and nothing is required. However, for nodes containing the second, additional processes may be required. First, note that for a single replacement process, only one branch of nodes will use these additional processes. Put another way, for any layer of nodes, a maximum of one node will actually contain this second to be added/subtracted.

In a replacement process, the first node encountered is the node of the base layer, which can be modified directly, given that there are no other nodes pointing to it. Call this node $N_{parent}$. After this, the children of $N_{parent}$ are queried. For all children before $t_{leapSecond}$, they are considered nodes before the second so those nodes can remain the same and nothing is required. Eventually, a node will be encountered that contains the timestamp, and is referred to as $N_{contains}$. A new node $N_{replacement}$ is created that copies $N_{contains}$ in every way except $t_{endSecond}$ and its corresponding ID. In the case of adding a leap second, the $t_{newEndSecond}=t_{endSecond}+1$. Then the replacement process replace($N_{parent}$, $N_{contains}$, $N_{replacement}$) as described with respect to FIGS. 4A and 4B is called.

Continuing the iteration of $N_{parent}$'s children, all of the children after replacement will be nodes after the second. After the iteration of $N_{parent}$'s children is complete, $N_{parent}$ is set to $N_{replacement}$. The replacement process is repeated on the children of $N_{replacement}$. The stop condition is when $N_{parent}$ has no child that contains a leap second. After the replacement process has been fully applied to a particular branch where $N_{contains}$ was found, iterating is finished through the base layer. After the replacement node is added, all remaining nodes are considered nodes after the second. To update nodes after the second, instead of adding 1 to only $t_{endSecond}$, 1 is added to $t_{startSecond}$ as well. Unlike the node that contains the second, this addition occurs at the parent node, given that the $t_{startSecond}$ for the parent node is increased by 1 and every child is relative this parent node. No further additions are necessary.

In addition to adding and subtracting seconds from time as needed, the present techniques enable the addition of new labels. For example, consider a scenario where a new month of "Smarch" is added to the typical Gregorian calendar. To implement an addition process, again, the time nodes in the tree structure described herein fall into three categories, each needing to be approached differently: (1) Nodes before the new month, (2) Nodes containing the new month, and (3) Nodes after the new month. During an addition process, for nodes that occur before the new month, the nodes can remain the same and nothing is required. However, for nodes containing the new month, additional processes may be required.

There are a few subcases to consider when adding a month label: (1) The current layer is above a month layer (e.g. a year, century, etc.); (2) The current layer is the month layer; (3) The current layer is below a month layer (day, hour, etc.) When the current layer is above a month, $t_{endSecond}$ is modified by adding to it the number of seconds that is the length of the month to be added. The sibling months are then modified by adding the length of $N_{smarch}$ in seconds to $t_{startSecond}$ and $t_{endSecond}$.

When current layer is the month layer, an entirely new node $N_{smarch}$ is inserted in the layer. The sibling months are then modified by adding the length of $N_{smarch}$ in seconds to $t_{startSecond}$ and $t_{endSecond}$. When the current layer is below a month, nothing needs to be done. Here, an assumption is made that $N_{smarch}$ has been constructed in such a way that it contains the proper number of children nodes, presumably all being day nodes.

For ease of description, the present techniques have been described such that a single descriptive label corresponds to the time interval of each node. For example, the month of March may correspond to a particular time interval, with no other months corresponding to the time interval represented by March. However, there calendars with have cases such that a child label will have two parents. One such example would be in the Japanese Era Calendar during the transition from the Showa era to the Heisei era in January of 1989. In this example, days 1-7 of January belong to Showa Era, whereas 8-31 belong to Heisei Era. In other words, there is month label that belongs to two different year labels.

Another example is that of a school year calendar that is split into a series of semesters and breaks from school that span the year. In this example, a school year calendar may begin in August of a Gregorian calendar system and end the following May in a Gregorian calendar system. The school year may have one or more semesters. A semester not only can have multiple years (for example, a winter break that crosses the new year mark), but also a semester may end in a disjoint manner with a child month (for example, a spring semester that ends in the middle of April). As used in this example, a semester may be a label that occurs with nodes that are between year and month labels in the exemplary Gregorian calendar system. However, in some cases the label that corresponds to multiple parent labels may be smaller than a month.

In the present example, consider a school calendar's Winter Break of 2018 that begins on Dec. 15, 2018 and ends at the end of the day on Jan. 13, 2019 (one second before the first second of Jan. 14, 2019). The school calendar system is represented as data according to the techniques described herein. Similar to adding a leap second or a leap month as described above, an additional custom branch is added to the tree structure. Replica nodes with new node IDs are created for the parent nodes of 2018 and 2019, $N_{2018}$ and $N_{2019}$. The start/end times of the parent nodes $N_{2018}$ and $N_{2019}$ are not modified. However, if a child node is changed in any manner, unless it is changed in a custom branch of the tree structure all the children nodes of all branches are modified.

In this example, a node $N_{winterBreak2018PreNewYears}$ and a node $N_{winterBreak2018PostNewYears}$ are constructed to correspond to the label "Winter Break of 2018." Each node $N_{winterBreak2018PreNewYears}$ and $N_{winterBreak2018PostNewYears}$ has start and end times relative to their parent nodes, which will be $N_{2018}$ and $N_{2019}$ respectively. The node $N_{winterBreak2018PreNewYears}$ is assigned a $t_{startTime}=30067200$ and $t_{endTime}=32659199$. Note that $t_{endTime}$ is after 2018 and therefore outside the scope of $N_{2018}$, this is intentional. The node $N_{winterBreak2018PostNewYears}$ is assigned a $t_{startTime}=-1468800$ and $t_{endTime}=1123199$. Similarly the $t_{startTime}$ of $N_{winterBreak2018PostNewYears}$ is outside the scope of $N_{2019}$. Each of the node $N_{winterBreak2018PreNewYears}$ and $N_{winterBreak2018PostNewYears}$ are assigned a label identification (ID). In particular, the node $N_{winterBreak2018PreNewYears}$ and $N_{winterBreak2018PostNewYears}$ are assigned the same label ID. The label ID may correspond to a human readable label. How the label ID is represented is irrelevant as long as uniqueness is ensured, where a label ID is never equal to another label ID unless it is intended.

To modify the child nodes, note that in this particular example, the semester is smaller than the month children it will hold. However, this won't always be the case. There are two basic cases that are of interest. The first case is when a semester encapsulates a month child. In this case, the month child node is assigned to be one of the semester label's children, with start/end times relative to the semester's start time. The second case is where a semester shares a month child with one or more semesters. In this second case, a month could be shared with many semesters. For example, a quarterly system may result in a month having the end of one semester, a break, and then the beginning of another semester.

In the second case each month child node has start times before the parent node's start times and end times greater than the parent node's end times. The label ID of each duplicate child node generated is the same, while the node ID is unique. Note that this case includes a semester that is completely encapsulated by a month or a semester that is split by months.

Continuing with the Winter Break 2018 example, the month of December ($N_{december}$) is shared between two semesters, $N_{fallSemester2018}$ and $N_{winterBreak2018PreNewYears}$, with the month of January ($N_{January}$) being shared between two semesters, $N_{winterBreak2018PostNewYears}$ and $N_{springSemester2019}$. If a query is issued for a section of time between Jan. 1, 2019 and Jan. 13, 2019, one copy of $N_{January}$ is returned. The same applies to a query issued for a section of time after Jan. 13, 2019 (assuming the query is within the interval of $N_{January}$). However, if a query is issued for a timeslot such as Jan. 10-15, 2019, two copies of the $N_{January}$ node may be returned. These two copies are $N_{January}$ and $N_{January}$, with one belonging to $N_{winterBreak2018PostNewYears}$ and one belonging to $N_{springSemester2019}$. This is because both nodes exist in memory, being substantially identical except for the node ID. Substantially identical refers to the start and end times of the nodes appearing identical once they've been recalculated to consider their parent node's start times. Because the nodes $N_{winterBreak2018PreNewYears}$ and $N_{winterBreak2018PostNewYears}$ are assigned the same label ID, the nodes can be filtered to remove duplicates. The nodes are filtered by checking to determine if a node has been added with the same label ID the results set. Regardless of which duplicate child node is obtained, it will have the proper time, given that its start and end times are not confined to its parent node's start and end times but are still relative to them.

The same logic applies to querying across the 2018 and 2019 border. Here, both $N_{winterBreak2018PreNewYears}$ and $N_{winterBreak2018PostNewYears}$ are received, but given that they have the same label ID, one is filtered out, thus rendering no duplicates. While conceptually a child node will have two parents, functionally, the data structure maintains a one-to-many relationship with the children nodes.

Figure 5:
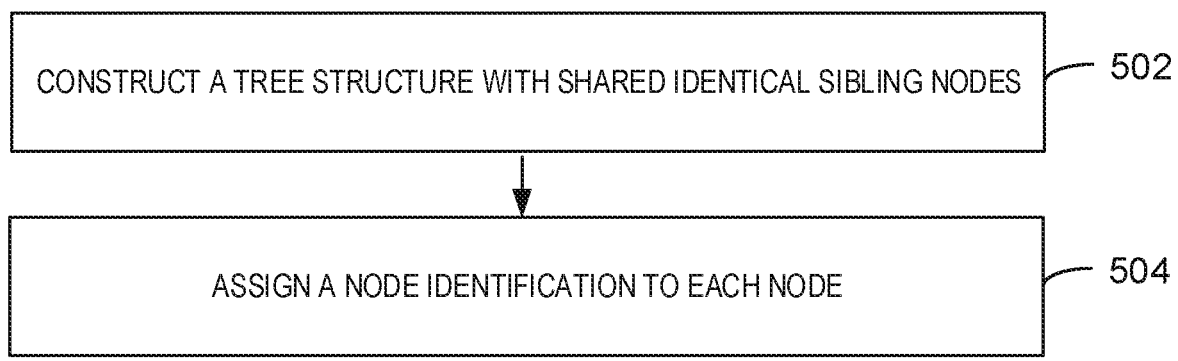
FIG. 5 is a process flow diagram of a method that enables time as data.

FIG. 5 is a process flow diagram of a method 500 that enables time as data. At block 502, a tree structure is constructed, wherein layers of the tree comprise identical sibling nodes for layer above a threshold interval size and parent nodes share identical sibling nodes. As used herein, the threshold interval size may be a number of years below which, there exists no identical intervals. With regard to the Gregorian calendar, the threshold interval size is an interval of 10,000 years. Intervals, such as millennium (1000) years, are not identical with regard to time due to the leap year mechanism integrated into the Gregorian calendar. In a different calendar system, the threshold interval size may vary.

Moreover, intervals of nodes above the threshold interval size are identical. In particular, the time intervals contained in the intervals of nodes above the threshold interval size contain exactly the same amount of time. At block 504, a node identification is assigned to each node of the tree structure, wherein each node of the tree structure corresponds to a particular time interval. In embodiments, the node ID may be any value. In some cases, the node ID is an encoded form of the node. The node ID may also be deterministic.

To convert a system time value to human readable time, the tree structure is traversed according to a tree traversal algorithm. In particular, the tree may be traversed by visiting each node that contains the time stamp. In this manner, a time table in the form of a compressed tree with a lookup table enables a flexible source of information for acquiring a "label" of a timestamp. With such a flexible system, the Japanese government can easily modify their year labels, schools can insert their breaks as part of the calendar itself, scientific bodies can add leap seconds, and other cases involving the need to modify a calendar past its rigorous mathematical setup become possible.

Figure 6:
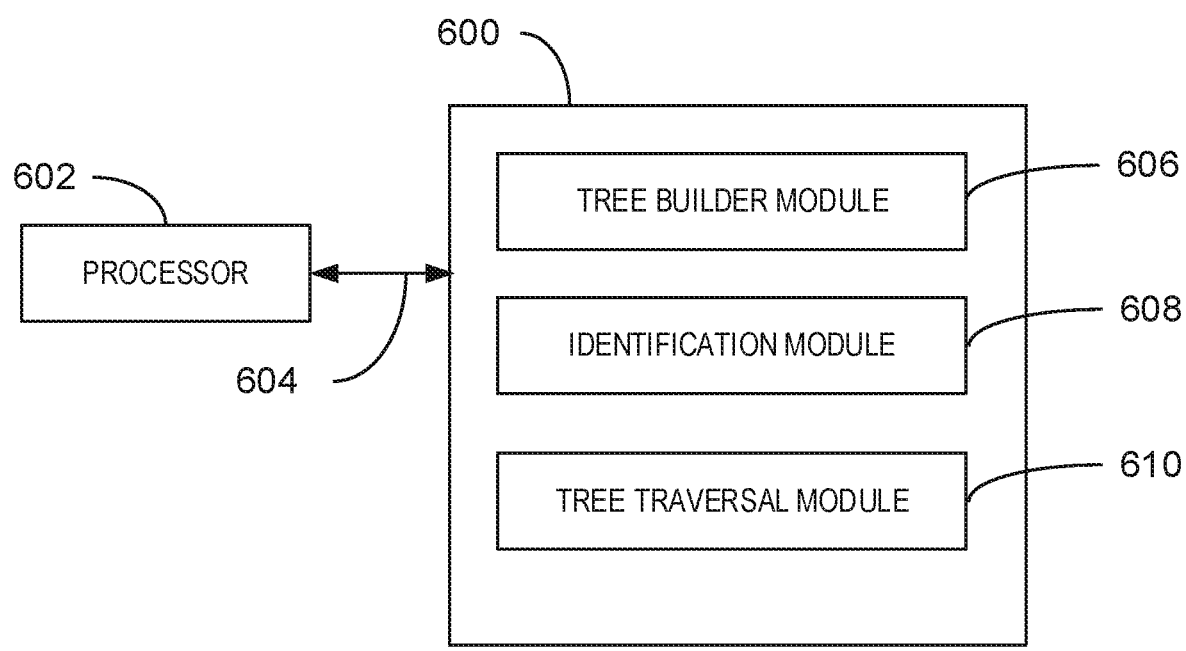
FIG. 6 illustrates a block diagram of a non-transitory computer readable media for that enables time as data.

FIG. 6 illustrates a block diagram of a non-transitory computer readable media for that enables time as data. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the current method.

The various software components discussed herein may be stored on the tangible, non-transitory, computer-readable medium 600, as indicated in FIG. 6. For example, a tree builder module 606 may construct a tree structure, wherein layers of the tree comprise identical sibling nodes for layer above a threshold interval size and parent nodes share identical sibling nodes. An identification module 608 assigns a node identification to each node of the tree structure. A tree traversal module 610 may be configured to traverse the tree structure according to a tree traversal algorithm. In particular, the tree may be traversed by visiting each node that contains the time stamp.

It is to be understood that any suitable number of the software components shown in FIG. 6 may be included within the tangible, non-transitory computer-readable medium 600. Furthermore, any number of additional software components not shown in FIG. 6 may be included within the tangible, non-transitory, computer-readable medium 600, depending on the specific application.

FIG. 7 is a block diagram of an example of a computing system that can enable a time as data. The example system 700 includes a computing device 702. The computing device 702 includes a processing unit 704, a system memory 706, and a system bus 708. In some examples, the computing device 702 can be a gaming console, a personal computer (PC), an accessory console, a gaming controller, among other computing devices. In some examples, the computing device 702 can be a node in a cloud network.

The system bus 708 couples system components including, but not limited to, the system memory 706 to the processing unit 704. The processing unit 704 can be any of various available processors. Dual microprocessors and other multiprocessor architectures also can be employed as the processing unit 704. The system bus 708 can be any of several types of bus structure, including the memory bus or memory controller, a peripheral bus or external bus, and a local bus using any variety of available bus architectures known to those of ordinary skill in the art. The system memory 706 includes computer-readable storage media that includes volatile memory 710 and nonvolatile memory 712.

In some embodiments, a unified extensible firmware interface (UEFI) manager or a basic input/output system (BIOS), containing the basic routines to transfer information between elements within the computer 702, such as during start-up, is stored in nonvolatile memory 712. By way of illustration, and not limitation, nonvolatile memory 712 can include read-only memory (ROM), programmable ROM (PROM), electrically programmable ROM (EPROM), electrically erasable programmable ROM (EEPROM), or flash memory.

Volatile memory 710 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 702 also includes other computer-readable media, such as removable/non-removable, volatile/nonvolatile computer storage media. FIG. 7 shows, for example a disk storage 714. In embodiments, the disk storage 714 may include a calendar content database that is to store at least one item of calendar content. Disk storage 714 includes, but is not limited to, devices like a magnetic disk drive, floppy disk drive, tape drive, Jaz drive, Zip drive, LS-210 drive, flash memory card, or memory stick.

In addition, disk storage 714 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 714 to the system bus 708, a removable or non-removable interface is typically used such as interface 716.

It is to be appreciated that FIG. 7 describes software that acts as an intermediary between users and the basic computer resources described in the suitable operating environment 700. Such software includes an operating system 718. Operating system 718, which can be stored on disk storage 714, acts to control and allocate resources of the computer 702.

System applications 720 take advantage of the management of resources by operating system 718 through program modules 722 and program data 724 stored either in system memory 706 or on disk storage 714. It is to be appreciated that the disclosed subject matter can be implemented with various operating systems or combinations of operating systems.

A user enters commands or information into the computer 702 through input devices 726. Input devices 726 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, any suitable dial accessory (physical or virtual), and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 726 connect to the processing unit 704 through the system bus 708 via interface ports 728. Interface ports 728 include, for example, a serial port, a parallel port, a game port, and a universal serial bus (USB).

Output devices 730 use some of the same type of ports as input devices 726. Thus, for example, a USB port may be used to provide input to the computer 702 and to output information from computer 702 to an output device 730.

Output adapter 732 is provided to illustrate that there are some output devices 730 like monitors, speakers, and printers, among other output devices 730, which are accessible via adapters. The output adapters 732 include, by way of illustration and not limitation, video and sound cards that provide a means of connection between the output device 730 and the system bus 708. It can be noted that other devices and systems of devices provide both input and output capabilities such as remote computing devices 734.

The computer 702 can be a server hosting various software applications in a networked environment using logical connections to one or more remote computers, such as remote computing devices 734. The remote computing devices 734 may be client systems configured with web browsers, PC applications, mobile phone applications, and the like. The remote computing devices 734 can be a personal computer, a server, a router, a network PC, a workstation, a microprocessor-based appliance, a mobile phone, a peer device or other common network node and the like, and typically includes many or all of the elements described relative to the computer 702.

Remote computing devices 734 can be logically connected to the computer 702 through a network interface 736 and then connected via a communication connection 738, which may be wireless. Network interface 736 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 738 refers to the hardware/software employed to connect the network interface 736 to the bus 708. While communication connection 738 is shown for illustrative clarity inside computer 702, it can also be external to the computer 702. The hardware/software for connection to the network interface 736 may include, for exemplary purposes, internal and external technologies such as, mobile phone switches, modems including regular telephone grade modems, cable modems and DSL modems, ISDN adapters, and Ethernet cards.

The computer 702 can further include a radio 740. For example, the radio 740 can be a wireless local area network radio that may operate one or more wireless bands. For example, the radio 740 can operate on the industrial, scientific, and medical (ISM) radio band at 2.4 GHz or 5 GHz. In some examples, the radio 740 can operate on any suitable radio band at any radio frequency.

The computer 702 includes one or more modules 722, such as a tree builder manager 742, an identification manager 744, and a tree traversal manager 746. In some embodiments, the tree builder manager 742 is configured to construct a tree structure, wherein layers of the tree comprise identical sibling nodes for layer above a threshold interval size and parent nodes share identical sibling nodes. The identification manager 744 may be configured to assign a node identification to each node of the tree structure. A tree traversal manager 746 may be configured to traverse the tree structure according to a tree traversal algorithm. In particular, the tree may be traversed by visiting each node that contains the time stamp.

It is to be understood that the block diagram of FIG. 7 is not intended to indicate that the computing system 702 is to include all of the components shown in FIG. 7. Rather, the computing system 702 can include fewer or additional components not illustrated in FIG. 7 (e.g., additional applications, additional modules, additional memory devices, additional network interfaces, etc.). Furthermore, any of the functionalities of the tree builder manager 742, identification manager 744, or the tree traversal manager 746 may be partially, or entirely, implemented in hardware and/or in the processing unit (also referred to herein as a processor) 704. For example, the functionality may be implemented with an application specific integrated circuit, in logic implemented in the processing unit 704, or in any other device.

EXAMPLES

Example 1 is a method that enables time as data. The method includes constructing a tree structure, wherein data of the tree structure is a plurality of time intervals, and layers of the tree structure below a root node comprise identical sibling nodes for layers above a threshold interval length and parent nodes share identical sibling nodes; assigning a node identification to each node of the tree structure, wherein each node of the tree structure corresponds to a time interval; and traversing the tree structure to convert a timestamp to a human readable time.

Example 2 includes the method of example 1, including or excluding optional features. In this example, the threshold interval length is an interval of 10,000 years.

Example 3 includes the method of any one of examples 1 to 2, including or excluding optional features. In this example, a length of the plurality of time intervals is determined based on a calendar system type.

Example 4 includes the method of any one of examples 1 to 3, including or excluding optional features. In this example, data from a plurality of nodes in layers of the tree structure above the threshold interval length corresponds to intervals of time that are repeatable units of time.

Example 5 includes the method of any one of examples 1 to 4, including or excluding optional features. In this example, data from a plurality of nodes in layers of the tree structure below the threshold interval length corresponds to intervals of time that vary according to leap values.

Example 6 includes the method of any one of examples 1 to 5, including or excluding optional features. In this example, the threshold interval length is an interval of a smallest repeatable unit of time according to a calendar system.

Example 7 includes the method of any one of examples 1 to 6, including or excluding optional features. In this example, data from a plurality of nodes in layers of the tree structure below the threshold interval length are compressed into a linear data structure.

Example 8 includes the method of any one of examples 1 to 7, including or excluding optional features. In this example, data of a node of the tree structure is an interval that starts with an earliest start time that corresponds to the earliest start time of the node's child nodes and ends with a latest end time that corresponds to the latest end time of the node's child nodes.

Example 9 is an electronic device. The electronic device includes a database comprising a tree structure, wherein data of the tree structure is a plurality of time intervals, and layers of the tree structure below a root node comprise identical sibling nodes for layers above a threshold interval length and parent nodes share identical sibling nodes; a node identifier to assign a node identification to each node of the tree structure, wherein each node of the tree structure corresponds to a time interval; and a tree traverser to traverse the tree structure to convert a timestamp to a human readable time.

Example 10 includes the electronic device of example 9, including or excluding optional features. In this example, the threshold interval length is an interval of 10,000 years.

Example 11 includes the electronic device of any one of examples 9 to 10, including or excluding optional features. In this example, a length of the plurality of time intervals is determined based on a calendar system type.

Example 12 includes the electronic device of any one of examples 9 to 11, including or excluding optional features. In this example, data from a plurality of nodes in layers of the tree structure above the threshold interval length corresponds to intervals of time that are repeatable units of time.

Example 13 includes the electronic device of any one of examples 9 to 12, including or excluding optional features. In this example, data from a plurality of nodes in layers of the tree structure below the threshold interval length corresponds to intervals of time that vary according to leap values.

Example 14 includes the electronic device of any one of examples 9 to 13, including or excluding optional features. In this example, the threshold interval length is an interval of a smallest repeatable unit of time according to a calendar system.

Example 15 includes the electronic device of any one of examples 9 to 14, including or excluding optional features. In this example, data from a plurality of nodes in layers of the tree structure below the threshold interval length are compressed into a linear data structure.

Example 16 includes the electronic device of any one of examples 9 to 15, including or excluding optional features. In this example, data of a node of the tree structure is an interval that starts with an earliest start time that corresponds to the earliest start time of the node's child nodes and ends with a latest end time that corresponds to the latest end time of the node's child nodes.

Example 17 is a computer readable medium including code. The computer-readable medium includes instructions that direct the processor to constructing a tree structure, wherein data of the tree structure is a plurality of time intervals, and layers of the tree structure below a root node comprise identical sibling nodes for layers above a threshold interval length and parent nodes share identical sibling nodes; assigning a node identification to each node of the tree structure, wherein each node of the tree structure corresponds to a time interval; and traversing the tree structure to convert a timestamp to a human readable time.

Example 18 includes the computer-readable medium of example 17, including or excluding optional features. In this example, the threshold interval length is an interval of 10,000 years.

Example 19 includes the computer-readable medium of any one of examples 17 to 18, including or excluding optional features. In this example, a length of the plurality of time intervals is determined based on a calendar system type.

Example 20 includes the computer-readable medium of any one of examples 17 to 19, including or excluding optional features. In this example, data from a plurality of nodes in layers of the tree structure above the threshold interval length corresponds to intervals of time that are repeatable units of time.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method that enables time as data, comprising:
constructing a tree structure, wherein data of the tree structure is a plurality of time intervals arranged into layers of nodes, and wherein the layers of the tree structure below a root node comprise identical sibling nodes for layers above a threshold interval size that is a smallest repeatable unit of time according to a calendar system;
assigning a node identification to each node of the tree structure, wherein each node of the tree structure corresponds to a time interval, and wherein the time interval for each node in the layers above the threshold interval size is a repeatable unit of time, and the time interval for each node in the layers below the threshold interval size varies according to leap values; and
traversing the tree structure to convert a timestamp to a human readable time.

2. The method of claim 1, wherein the threshold interval size is an interval of 10,000 years.

3. The method of claim 1, wherein a length of the plurality of time intervals is determined based on the calendar system.

4. The method of claim 1, wherein data from the nodes in the layers of the tree structure below the threshold interval size are compressed into a linear data structure.

5. The method of claim 1, wherein data of a node of the tree structure is an interval that starts with an earliest start time that corresponds to the earliest start time of the node's child nodes and ends with a latest end time that corresponds to the latest end time of the node's child nodes.

6. An electronic device, comprising:
a database comprising a tree structure, wherein data of the tree structure is a plurality of time intervals arranged into layers of nodes, and wherein the layers of the tree structure below a root node comprise identical sibling nodes for layers above a threshold interval size that is a smallest repeatable unit of time according to a calendar system;
a node identifier to assign a node identification to each node of the tree structure, wherein each node of the tree structure corresponds to a time interval, and wherein the time interval for each node in the layers above the threshold interval size is a repeatable unit of time, and the time interval for each node in the layers below the threshold interval size varies according to leap values; and
a tree traverser to traverse the tree structure to convert a timestamp to a human readable time.

7. The electronic device of claim 6, wherein the threshold interval size is an interval of 10,000 years.

8. The electronic device of claim 6, wherein a length of the plurality of time intervals is determined based on the calendar system.

9. The electronic device of claim 6, wherein data from the nodes in the layers of the tree structure below the threshold interval size are compressed into a linear data structure.

10. The electronic device of claim 6, wherein data of a node of the tree structure is an interval that starts with an earliest start time that corresponds to the earliest start time of the node's child nodes and ends with a latest end time that corresponds to the latest end time of the node's child nodes.

11. A non-transitory, computer-readable medium including code, when executed, to cause a processing device to carry out operations, the operations comprising:
constructing a tree structure, wherein data of the tree structure is a plurality of time intervals arranged into layers of nodes, and wherein the layers of the tree structure below a root node comprise identical sibling nodes for layers above a threshold interval size that is a smallest repeatable unit of time according to a calendar system;
assigning a node identification to each node of the tree structure, wherein each node of the tree structure corresponds to a time interval, and wherein the time interval for each node in the layers above the threshold interval size is a repeatable unit of time, and the time interval for each node in the layers below the threshold interval size varies according to leap values; and traversing the tree structure to convert a timestamp to a human readable time.

12. The non-transitory, computer-readable medium of claim 11, wherein the threshold interval size is an interval of 10,000 years.

13. The non-transitory, computer-readable medium of claim 11, wherein a length of the plurality of time intervals is determined based on the calendar system.

* * * * *